US010241616B2

(12) United States Patent
Lyons et al.

(10) Patent No.: US 10,241,616 B2
(45) Date of Patent: Mar. 26, 2019

(54) CALIBRATION OF SENSORS AND PROJECTOR

(71) Applicant: Hewlett-Packard Development Company L.P., Houston, TX (US)

(72) Inventors: Nicholas P Lyons, Sunnyvale, CA (US); Jinman Kang, San Diego, CA (US)

(73) Assignee: Hewlett-Packard Development Company, L.P., Spring, TX (US)

(*) Notice: Subject to any disclaimer, the term of this patent is extended or adjusted under 35 U.S.C. 154(b) by 204 days.

(21) Appl. No.: 15/121,690

(22) PCT Filed: Feb. 28, 2014

(86) PCT No.: PCT/US2014/019693
§ 371 (c)(1),
(2) Date: Aug. 25, 2016

(87) PCT Pub. No.: WO2015/130320
PCT Pub. Date: Sep. 3, 2015

(65) Prior Publication Data
US 2016/0378258 A1    Dec. 29, 2016

(51) Int. Cl.
*G06F 3/041* (2006.01)
*G06F 3/0488* (2013.01)
(Continued)

(52) U.S. Cl.
CPC ........... *G06F 3/0418* (2013.01); *G03B 17/54* (2013.01); *G03B 43/00* (2013.01); *G06F 1/1639* (2013.01);
(Continued)

(58) Field of Classification Search
CPC .. G06F 3/0418; G06F 3/04883; G06F 3/0488; G06F 1/1639; G06F 3/03545;
(Continued)

(56) References Cited

U.S. PATENT DOCUMENTS 5,917,937 A    6/1999  Szeliski et al.
6,618,076 B1   9/2003  Sukthankar et al.
(Continued)

FOREIGN PATENT DOCUMENTS

CN    102466519 A    5/2012
CN    102763422       10/2012
(Continued)

OTHER PUBLICATIONS

Gao, Rui et al; Microsoft Research-Mobile Surface; Microsoft Research; 2010; http://research.microsoft.com/en-us/projects/mobilesurface/ ~ 1 page.
(Continued)

*Primary Examiner* — Abhishek Sarma
(74) *Attorney, Agent, or Firm* — HP Inc. Patent Department (57) ABSTRACT

An example system, including a projector unit, an all-in-one computer comprising a calibration module and attachable to the projector unit, and a plurality of sensors communicatively coupled to the all-in-one computer is provided. In addition, the all-in-one computer stores mapping information relating to mappings between the plurality of sensors and the projector unit in a common coordinate system. Further, the calibration module calibrates the plurality of sensors and the projector unit using the mapping information.

20 Claims, 8 Drawing Sheets

(51) Int. Cl.
| | |
|---|---|
| *G06F 1/16* | (2006.01) |
| *G06F 3/00* | (2006.01) |
| *G06F 3/03* | (2006.01) |
| *G06F 3/042* | (2006.01) |
| *G06F 3/0354* | (2013.01) |
| *G03B 17/54* | (2006.01) |
| *G03B 43/00* | (2006.01) |
| *G03B 21/28* | (2006.01) |

(52) U.S. Cl.
CPC ............ *G06F 3/005* (2013.01); *G06F 3/0304* (2013.01); *G06F 3/03545* (2013.01); *G06F 3/0425* (2013.01); *G06F 3/0488* (2013.01); *G06F 3/04883* (2013.01); *G03B 21/28* (2013.01); *G06F 2200/1631* (2013.01); *G06F 2203/04101* (2013.01)

(58) Field of Classification Search
CPC ...... G06F 3/0425; G06F 3/0304; G06F 3/005; G06F 2203/04101; G06F 2200/1631; G03B 17/54; G03B 43/00; G03B 21/28
See application file for complete search history.

(56) References Cited

U.S. PATENT DOCUMENTS

| | | |
|---|---|---|
| 6,789,039 B1 | 9/2004 | Krumm |
| 6,985,175 B2 | 1/2006 | Iwai |
| 7,023,473 B2 | 4/2006 | Iwai |
| 7,023,536 B2 | 4/2006 | Zhang et al. |
| 7,038,846 B2 | 5/2006 | Mandella |
| 7,050,085 B1 | 5/2006 | Park |
| 7,068,303 B2 | 6/2006 | Zhang |
| 7,088,440 B2 | 8/2006 | Buermann et al. |
| 7,110,100 B2 | 9/2006 | Buermann et al. |
| 7,113,270 B2 | 9/2006 | Buermann et al. |
| 7,151,530 B2 | 12/2006 | Roeber et al. |
| 7,155,030 B2 | 12/2006 | Kim |
| 7,161,664 B2 | 1/2007 | Buermann et al. |
| 7,203,384 B2 | 4/2007 | Carl |
| 7,268,956 B2 | 9/2007 | Mandella |
| 7,474,809 B2 | 1/2009 | Carl et al. |
| 7,599,561 B2 | 10/2009 | Wilson et al. |
| 7,671,891 B2 | 3/2010 | Fitzgibbon |
| 7,710,391 B2 | 5/2010 | Bell et al. |
| 7,729,515 B2 | 6/2010 | Mandalla et al. |
| 7,809,194 B2 | 10/2010 | Zhang |
| 7,826,641 B2 | 11/2010 | Mandella et al. |
| 7,953,271 B2 | 5/2011 | Gu |
| 7,961,909 B2 | 6/2011 | Mandella et al. |
| 8,059,916 B2 | 11/2011 | Jaynes et al. |
| 8,121,640 B2 | 2/2012 | Russ et al. |
| 8,199,117 B2 | 6/2012 | Izadi et al. |
| 8,386,959 B2 | 2/2013 | Rohrabaugh et al. |
| 8,736,583 B2 | 5/2014 | Anderson et al. |
| 8,977,038 B2 | 3/2015 | Tian et al. |
| 9,519,968 B2 | 12/2016 | Kang et al. |
| 2004/0155965 A1 | 8/2004 | Jaynes et al. |
| 2004/0222987 A1 | 11/2004 | Chang et al. |
| 2005/0078092 A1 | 4/2005 | Clapper |
| 2005/0168437 A1 | 8/2005 | Carl et al. |
| 2005/0256395 A1 | 11/2005 | Anabuki et al. |
| 2008/0018591 A1 | 1/2008 | Pittel et al. |
| 2008/0031514 A1 | 2/2008 | Kakinami |
| 2008/0192017 A1 | 8/2008 | Hildebrandt et al. |
| 2009/0153669 A1 | 6/2009 | Kim |
| 2010/0085425 A1 | 4/2010 | Tan |
| 2010/0172567 A1 | 7/2010 | Prokoski |
| 2010/0194886 A1 | 8/2010 | Asari et al. |
| 2010/0245684 A1 | 9/2010 | Xiao et al. |
| 2011/0010122 A1 | 1/2011 | Ding |
| 2011/0176007 A1 | 7/2011 | Ding et al. |
| 2011/0205341 A1* | 8/2011 | Wilson ............... G06F 3/011 348/51 |
| 2011/0227915 A1 | 9/2011 | Mandella et al. |
| 2011/0242054 A1 | 10/2011 | Tsu |
| 2012/0035934 A1 | 2/2012 | Cunningham |
| 2012/0038549 A1 | 2/2012 | Mandella et al. |
| 2012/0105591 A1 | 5/2012 | Kim |
| 2012/0300044 A1 | 11/2012 | Thomas et al. |
| 2013/0010079 A1 | 1/2013 | Zhang et al. |
| 2013/0010081 A1 | 1/2013 | Tenney et al. |
| 2013/0077236 A1 | 3/2013 | Becze et al. |
| 2013/0147711 A1 | 6/2013 | Njolstad et al. |
| 2013/0194418 A1 | 8/2013 | Gonzalez-Banos et al. |
| 2013/0257748 A1 | 10/2013 | Ambrus et al. |
| 2013/0321589 A1 | 12/2013 | Kirk et al. |
| 2014/0002445 A1 | 1/2014 | Xiong et al. |
| 2014/0055364 A1 | 2/2014 | Sze et al. |
| 2014/0168378 A1 | 6/2014 | Hall |

FOREIGN PATENT DOCUMENTS

| | | |
|---|---|---|
| CN | 102782721 A | 11/2012 |
| CN | 102929430 | 2/2013 |
| CN | 102954770 A | 3/2013 |
| CN | 103455141 | 12/2013 |
| EP | 2 574 876 A1 | 4/2013 |
| JP | 2010-273091 A | 12/2010 |
| TW | 201120410 A | 6/2011 |
| WO | WO-2010/073024 A1 | 7/2010 |
| WO | WO-2011/106201 | 9/2011 |
| WO | WO-2011/106201 A2 | 9/2011 |
| WO | WO-2013/019252 A1 | 2/2013 |

OTHER PUBLICATIONS

Hand, Randall; Infinite Z Launches zSpace Virtual Holographic 3D Display for Designers; VizWorld.com; Dec. 13, 2011; 2 pages.
Harrison, B et al; Bringing Toys to Life: Intel Labs OASIS Project; Augmented Engineering; Jan. 26, 2011; http://augmentedengineering.wordpress.com/ ~ 1 page.
Harrison, Chris et al; OmniTouch: Wearable Muititouch Interaction Everywhere; UIST'11; Oct. 16, 2011; 10 pages.
Hartmann, Bjom et al; Pictionaire: Supporting Collaborative Design Work by Integrating Physical and Digital Artifacts; CSCW 2010; Feb. 6, 2010;4 pages.
Hinckley, Ken et al; Pen + Touch= New Tools; UIST'10; Oct. 3, 2010; 10 pages.
Junuzovic, Sasa et al; Microsoft Research-IllumiShare; Microsoft Research; 2012; http://delivery.acm.org/ ~ 2 pages.
Kane, Shaun K, et al; Bonfire: A Nomadic System for Hybrid Laptop-Tabletop Interaction; UIST'09; Oct. 4, 2009; 10 pages.
Linder, Natan et al; LuminAR: Portable Robotic Augmented Reality interface Design and Prototype; UIST'10, Oct. 3, 2010; 2 pages.
Melanson, Donald; Microsoft Research Working On Portable Surface, Mar. 2, 2010; http://www.engadget.com/ ~ 2 pages.
Melanson, Donald; Wiimote Repurposed for Multi-Point interactive Whiteboard; Dec. 10, 2007; http://www.engadget.com/ ~ 2 pages.
Shahraim Izadi et al., "C-Slate: A Multi-Touch and Object Recognition System for Remote Collaboration using Horizontal Surfaces," 2007, pp. 3-10, IEEE ~ 8 pages.
Simonite, Tom; A Kitchen Countertop With A Brain; MIT Technology Review; Jul. 2, 2010; 2 pages.
Wilson, Andrew D. et al; Combining Multiple Depth Cameras and Projectors for Interactions On, Above, and Between Surfaces; UIST'10; Oct. 3, 2010; 10 pages.
Wilson, Andrew D.; Using A Depth Camera As A Touch Sensor; ITS 2010: Devices & Algorithms: Nov. 7, 2010; 4 pages.
Daniel, H.C. et al., Joint Depth and Color Camera Calibration with Distortion Correction, (Research Paper), IEEE Transactions on Pattern Analysis and Machine Intelligence, Oct. 2012, pp. 2058-2064, vol. 34, No. 10.
Devin Coldewey, http://techcrunch.com~New Samsung Sensor Captures Both Light and Depth Data, Feb. 29, 2012 (2 pages).
Roger Y. Tsai, IEEE Journal of Robotics and Automation, vol. RA-3, No. 4, Aug. 1987, A Versatile Camera Callibration Technique (56) References Cited

OTHER PUBLICATIONS for High-Accuracy 3D Machine Vision Metrology Using Off-the-Shelf TV Cameras and Lenses (22 pages).
Website: http://docs.opencv.org—Camera calibration With OpenCV dated on or before Nov. 29, 2012 (14 pages).
Wikipedia, Kinect dated on or before Nov. 29, 2012 (15 pages).
Zhengyou Zhang, Flexible Camera Calibration By Viewing a Plane From Unknown Orientations, 1999 (8 pages).
Zhengyou Zhang, Technical Report MSR-TR-98-71, A Flexible New Technique for Camera Calibration, Dec. 1998 (22 pages).

* cited by examiner

CALIBRATION OF SENSORS AND PROJECTOR

BACKGROUND

A visual sensor is a sensor that can capture visual data associated with a target. The visual data can include an image of the target or a video of the target. A cluster of heterogeneous visual sensors (different types of visual sensors) can be used for certain applications, which may be employed in computer systems. Visual data collected by the heterogeneous sensors can be combined and processed to perform a task associated with the respective application. Moreover, different heterogeneous visual sensors may have different resolution and fields of view.

BRIEF DESCRIPTION OF THE DRAWINGS

For a detailed description of various examples, reference will now be made to the accompanying drawings in which.

DETAILED DESCRIPTION

Various aspects of the present disclosure are directed to calibrating the sensor cluster and a projection unit. More specifically, and as described in greater detail below, various aspects of the present disclosure are directed to a manner by which a plurality of sensors, including a depth sensor and a gesture sensor are calibrated with respect to each other and with a projector to allow for proper operation.

Aspects of the present disclosure described herein discuss the use of heterogeneous visual sensors (different types of visual sensors) in a cluster. Among other things, this approach allows for the capture of richer and more robust information for various applications.

Moreover, aspects of the present disclosure described herein discuss properly calibrating the sensor cluster. This approach allows sensors and projector to know where an object is located in their coordinate systems when one sensor has located an object within its field of view by identifying a common coordinate system for the sensors and projector. Among other things, this approach allows sensors and projector to be able to refer to the same point location across all sensor coordinate systems.

Further, aspects of the present disclosure described herein also disclose transforming x, y and z coordinates from one sensor coordinate system into another coordinate system seamlessly. Accordingly, a software developer creating program to utilize data from multiple sensors to be able to simplify the task complexity and build better applications faster. Among other things, this approach allows sensor fusion, leading to an ability to combine sensory data or data derived from sensory data from disparate sources such that the resulting information is achieved which would not have happened when these sources were individually.

In one example in accordance with the present disclosure, an example system including a projector unit, an all-in-one computer comprising a calibration module and attachable to the projector unit, and a plurality of sensors communicatively coupled to the all-in-one computer is provided. In addition, the all-in-one computer stores mapping information relating to mappings between the plurality of sensors and the projector unit in a common coordinate system. Further, the calibration module calibrates the plurality of sensors and the projector unit using the mapping information.

In another example in accordance with the present disclosure, a method is provided. The method comprise capturing, by a first sensor, a calibration pattern, wherein the plurality of sensors having at least a first sensor and a second sensor, detecting features of the calibration pattern, the features associated with coordinates in coordinate space of the first sensor, mapping coordinates of the detected features to a common coordinate space, and deriving a mapping between coordinates in the coordinate space of a second sensor and the common coordinate space based on the mapped coordinates and the coordinates in the coordinate space of the first sensor.

FIGS. 1-4 illustrate an example system 100 in accordance with an implementation. It should be readily apparent that the present illustration should not be interpreted to be limited by this particular illustrative architecture shown in FIG. 1, and the system 100 represents a generalized illustration and that other elements may be added or the illustrated elements may be removed, modified, or rearranged in many ways. The system 100 comprises a support structure 110, a computing device 150, a projector unit 180, and a touch sensitive mat 200. Computing device 150 may comprise any suitable computing device while still complying with the principles disclosed herein. For example, in some implementations, device 150 may comprise an electronic display, a smartphone, a tablet, an all-in-one computer (i.e., a display that also houses the computers board), or some combination thereof. In this example, device 150 is an all-in-one computer that includes a central axis or center line 155, first or top side 150a, a second or bottom side 150b axially opposite the top side 150a, a front side 150c extending axially between the sides 150a, 150b, a rear side also extending axially between the sides 150a, 150b and generally radially opposite the front side 150c. A display 152 defines a viewing surface and is disposed along the front side 150c to project images for viewing and interaction by a user (not shown). In some examples, display 152 includes touch sensitive technology such as, for example, resistive, capacitive, acoustic wave, infrared (IR), strain gauge, optical, acoustic pulse recognition, or some combination thereof. Therefore, throughout the following description, display 152 may periodically be referred to as a touch sensitive surface or display. In addition, in some examples, device 150 further includes a camera 154 that is to take images of a user while he or she is positioned in front of display 152. In some, implementations, camera 154 is a web camera. Further, in some examples, device 150 also includes a microphone or similar device that is arranged to receive sound inputs (e.g., voice) from a user during operation.

Referring still to FIGS. 1-4, support structure 110 includes a base 120, an upright member 140, and a top 160. Base 120 includes a first or front end 120a, and a second or rear end 120b. During operation, base 120 engages with a support surface 15 to support the weight of at least a portion of the components (e.g., member 140, unit 180, device 150, top 160, etc.) of system 100 during operation. In this example, front end 120a of base 120 includes a raised portion 122 that is slightly separated above the support surface 15 thereby creating a space or clearance between portion 122 and surface 15. As will be explained in more detail below, during operation of system 100, one side of mat 200 is received within the space formed between portion 122 and surface 15 to ensure proper alignment of mat 200. However, it should be appreciated that in other examples, other suitable alignments methods or devices may be used while still complying with the principles disclosed herein.

Upright member 140 includes a first or upper end 140a, a second or lower end 140b opposite the upper end 140a, a first or front side 140c extending between the ends 140a, 140b, and a second or rear side 140d opposite the front side 140c and also extending between the ends 140a, 140b. The lower end 140b of member 140 is coupled to the rear end 120b of base 120, such that member 140 extends substantially upward from the support surface 15.

Top 160 includes a first or proximate end 160a, a second or distal end 160b opposite the proximate end 160a, a top surface 160c extending between the ends 160a, 160b, and a bottom surface 160d opposite the top surface 160c and also extending between the ends 160a, 160b. Proximate end 160a of top 160 is coupled to upper end 140a of upright member 140 such that distal end 160b extends outward therefrom. As a result, in the example shown in FIG. 2, top 160 is supported only at end 160a and thus is referred to herein as a "cantilevered" top. In some examples, base 120, member 140, and top 160 are all monolithically formed; however, it should be appreciated that in other example, base 120, member 140, and/or top 160 may not be monolithically formed while still complying with the principles disclosed herein.

Referring still to FIGS. 1-4, mat 200 includes a central axis or centerline 205, a first or front side 200a, and a second or rear side 200b axially opposite the front side 200a. In this example, a touch sensitive surface 202, which represents a projector space, is disposed on mat 200 and is substantially aligned with the axis 205. Surface 202 may comprise any suitable touch sensitive technology for detecting and tracking one or multiple touch inputs by a user in order to allow the user to interact with software being executed by device 150 or some other computing device (not shown). For example, in some implementations, surface 202 may utilize known touch sensitive technologies such as, for example, resistive, capacitive, acoustic wave, infrared, strain gauge, optical, acoustic pulse recognition, or some combination thereof while still complying with the principles disclosed herein. In addition, in this example, surface 202 extends over only a portion of mat 200; however, it should be appreciated that in other examples, surface 202 may extend over substantially all of mat 200 while still complying with the principles disclosed herein.

During, operation, mat 200 is aligned with base 120 of structure 110, as previously described to ensure proper alignment thereof. In particular, in this example, rear side 200b of mat 200 is pieced between the raised portion 122 of base 120 and support surface 15 such that rear end 200b is aligned with front side 120a of base, thereby ensuring proper overall alignment of mat 200, and particularly surface 202, with other components within system 100. In some examples, mat 200 is aligned with device 150 such that the center line 155 of device 150 is substantially aligned with center line 205 of mat 200; however, other alignments are possible. In addition, as will be described in more detail below, in at least some examples surface 202 of mat 200 and device 150 are electrically coupled to one another such that user inputs received by surface 202 are communicated to device 150. Any suitable wireless or wired electrical coupling or connection may be used between surface 202 and device 150 such as for example, WI-FI, BLUETOOTH®, ultrasonic, electrical cables, electrical leads, electrical spring-loaded pogo pins with magnetic holding force, or some combination thereof, while still complying with the principles disclosed herein. In this example, exposed electrical contacts disposed on rear side 200b of mat 200 engage with corresponding electrical pogo-pin leads within portion 122 of base 120 to transfer signals between device 150 and surface 202 during operation. In addition, in this example, the electrical contacts are held together by adjacent magnets located in the clearance between portion 122 of base 120 and surface 15, previously described, to magnetically attract and hold (e.g., mechanically) a corresponding ferrous and/or magnetic material disposed along rear side 200b of mat 200.

Figure 1:
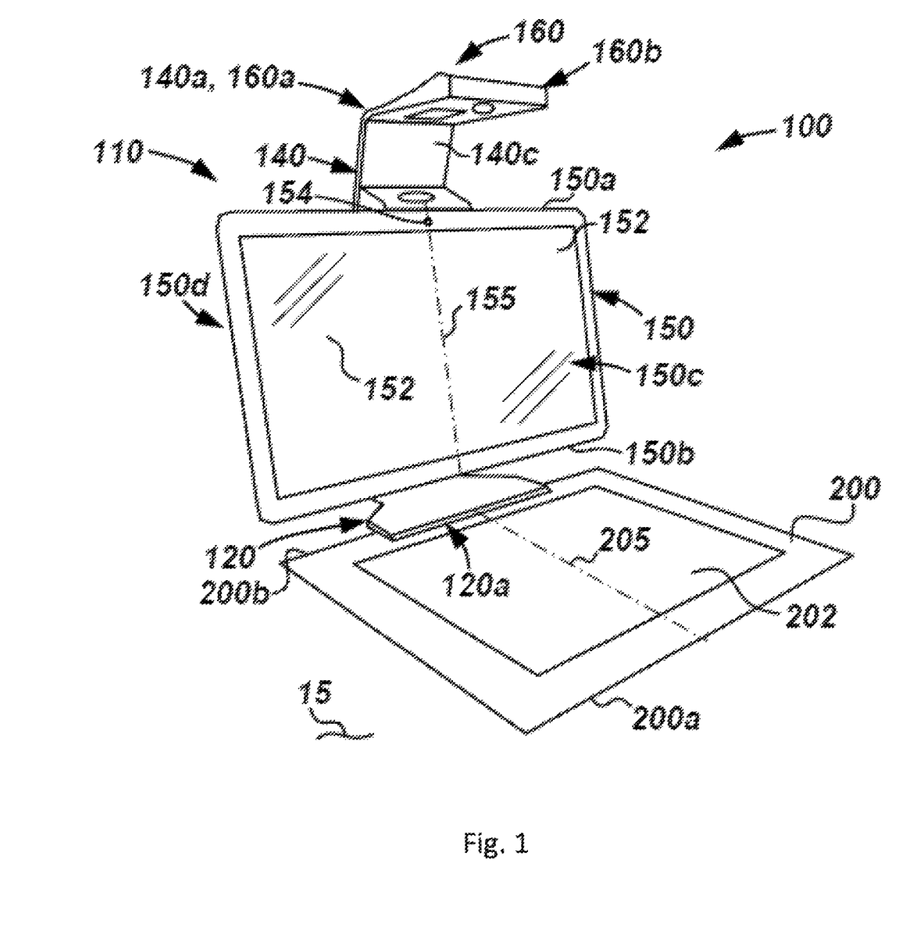
FIG. 1 is a schematic perspective view of an example of a computer system in accordance with the principles disclosed herein.
Figure 2:
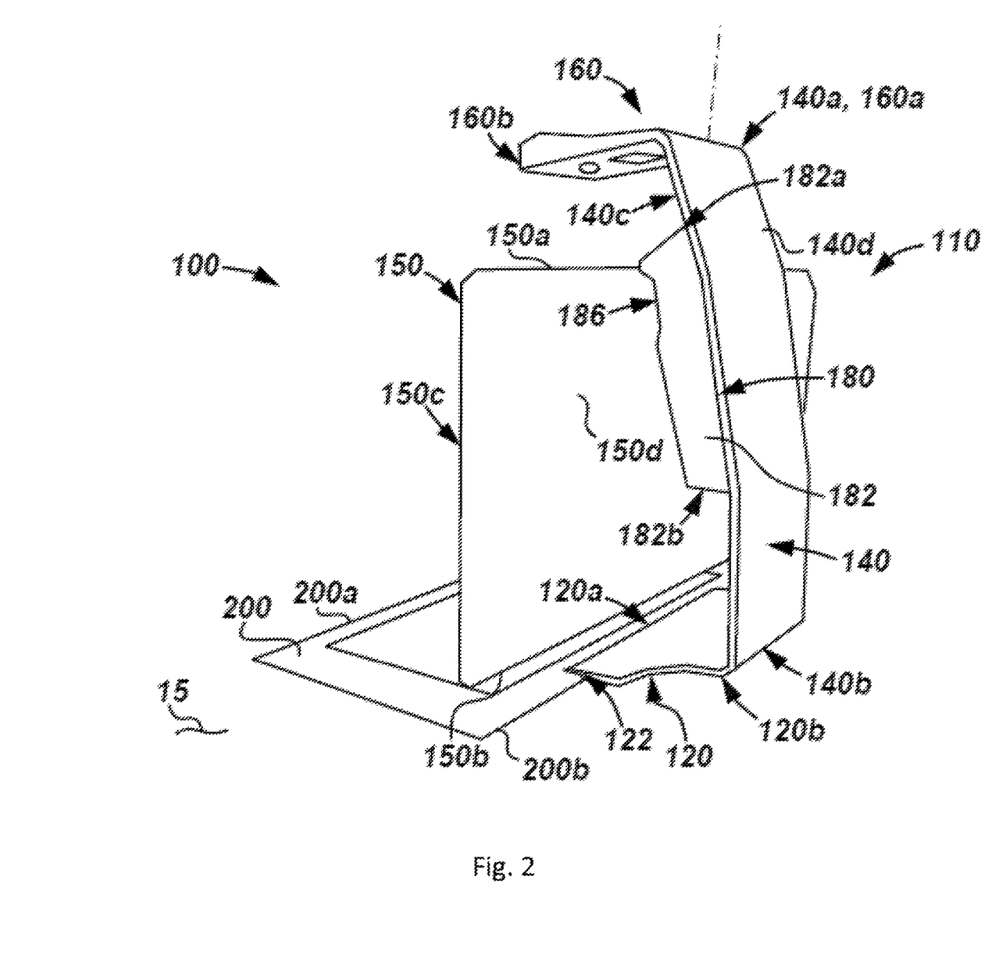
FIG. 2 is another schematic perspective view of the computer system of FIG. 1 in accordance with the principles disclosed herein.
Figure 3:
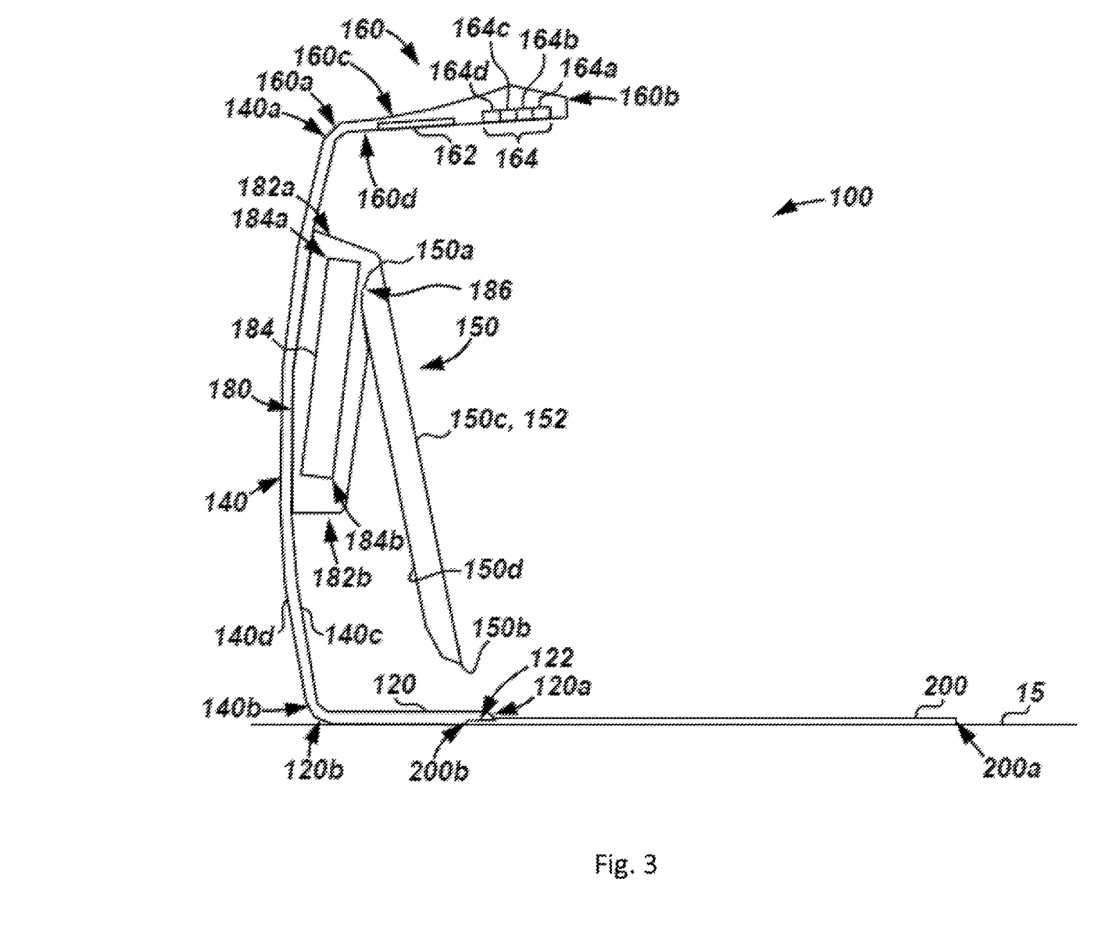
FIG. 3 is a schematic side view of the computer system of FIG. 1 in accordance with the principles disclosed herein.

Referring specifically now to FIG. 3, projector unit 180 comprises an outer housing 182, and a projector assembly 184 disposed within housing 182. Housing 182 includes a first or upper end 182a, a second or lower end 182b opposite the upper end 182a, and an inner cavity 183. In this embodiment, housing 182 further includes a coupling or mounting member 186 to engage with and support device 150 during operations. In general member 186 may be any suitable member or device for suspending and supporting a computer device (e.g., device 150) while still complying with the principles disclosed herein. For example, in some implementations, member 186 comprises a hinge that includes an axis of rotation such that a user (not shown) may rotate device 150 about the axis of rotation to attain an optimal viewing angle therewith. Further, in some examples, device 150 is permanently or semi-permanently attached to housing 182 of unit 180. For example, in some implementations, the housing 180 and device 150 are integrally and/or monolithically formed as a single unit.

Figure 4:
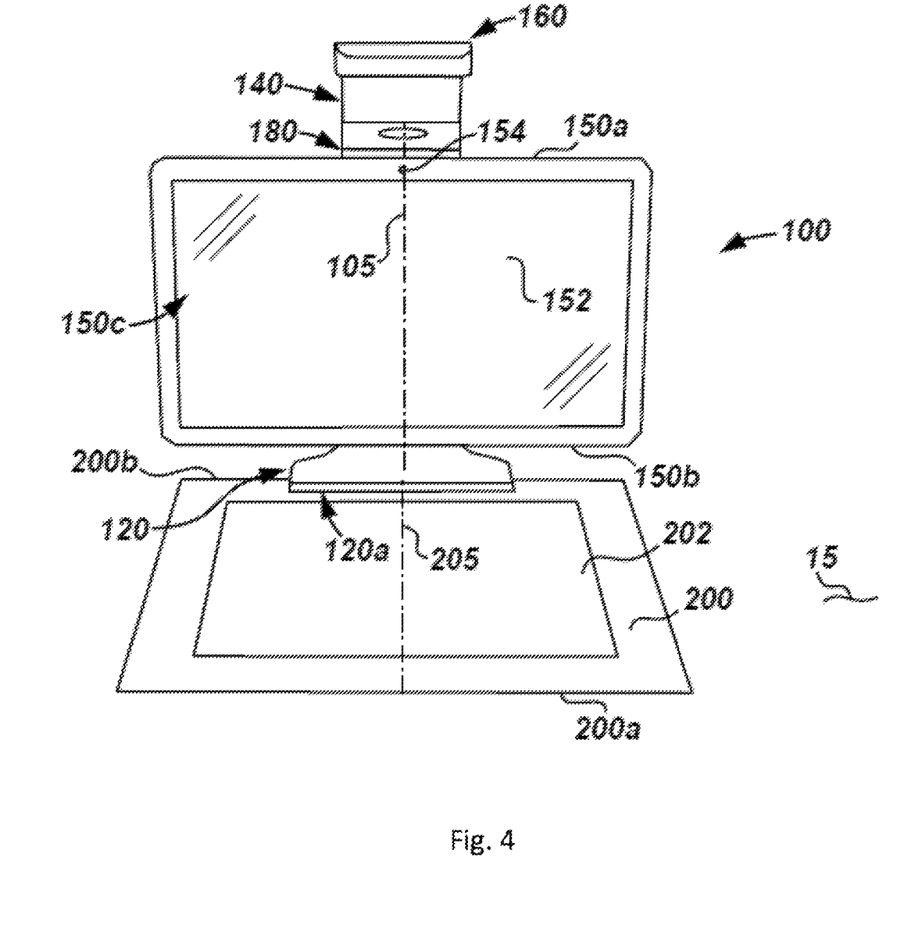
FIG. 4 is a schematic front view of the computer system of FIG. 1 in accordance with the principles disclosed herein.

Thus, referring briefly to FIG. 4, when device 150 is suspended from structure 110 through, the mounting member 186 on housing 182, projector unit 180 (i.e., both housing 182 and assembly 184) is substantially hidden behind device 150 when system 100 is viewed from a viewing surface or viewing angle that is substantially facing display 152 disposed on front side 150c of device 150. In addition, as is also shown in FIG. 4, when device 150 is suspended from structure 110 in the manner described, projector unit 180 (i.e., both housing 182 and assembly 184) and any image projected thereby is substantially aligned or centered with respect to the center line 155 of device 150.

Projector assembly 184 is generally disposed within cavity 183 of housing 182, and includes a first or upper end 184a, a second or lower end 184b opposite the upper end 184a. Upper end 184a is proximate upper end 182a of housing 182 while lower end 184b is proximate lower end 182b of housing 182. Projector assembly 184 may comprise any suitable digital light projector assembly for receiving data from a computing device (e.g., device 150) and projecting an image or images (e.g., out of upper end 184a) that correspond with that input data. For example, in some implementations, projector assembly 184 comprises a digital light processing (DLP) projector or a liquid crystal on silicon (LCoS) projector which are advantageously compact and power efficient projection engines capable of multiple display resolutions and sizes, such as, for example, standard XGA (1024×768) resolution 4:3 aspect ratio or standard WXGA (1280×800) resolution 16:10 aspect ratio. Projector assembly 184 is further electrically coupled to device 150 in order to receive data therefrom for producing light and images from end 184*a* during operation. Projector assembly 184 may be electrically coupled to device 150 through any suitable type of electrical coupling while still complying with the principles disclosed herein. For example, in some implementations, assembly 184 is electrically coupled to device 150 through an electric conductor, WI-FI, BLUETOOTH®, an optical connection, an ultrasonic connection, or some combination thereof. In this example, device 150 is electrically coupled to assembly 184 through electrical leads or conductors (previously described) that are disposed within mounting member 186 such that when device 150 is suspended from structure 110 through member 186, the electrical leads disposed within member 186 contact corresponding leads or conductors disposed on device 150.

Referring still to FIG. 3, top 160 further includes a fold mirror 162 and a sensor bundle 164. Mirror 162 includes a highly reflective surface 162*a* that is disposed along bottom surface 160*d* of top 160 and is positioned to reflect images and/or light projected from upper end 184*a* of projector assembly 184 toward mat 200 during operation. Mirror 162 may comprise any suitable type of mirror or reflective surface while still complying with the principles disclosed herein. In this example, fold mirror 162 comprises a standard front surface vacuum metalized aluminum coated glass mirror that acts to fold light emitted from assembly 184 down to mat 200. In other examples, mirror 162 could have a complex aspherical curvature to act as a reflective lens element to provide additional focusing power or optical correction.

Sensor bundle 164 includes a plurality of sensors (e.g., heterogeneous sensors) and/or cameras to measure and/or detect various parameters occurring on or near mat 200 during operation. For example, in the specific implementation depicted in FIG. 3, bundle 164 includes an ambient light sensor 164*a*, a camera (e.g., a color camera) 164*b*, a depth sensor or camera 164*c*, and a three dimensional (3D) user interface (e.g., gesture) sensor 164*d*. Each sensor may have a different resolution and field of view. In one example, each of these sensors may be aimed at the horizontal touch sensitive mat 200 and touch sensitive surface 202 (e.g., screen for the projector). Accordingly, the field of views of these sensors may overlap.

Examples of applications in which sensor bundle 164 can be used include object detection, object tracking, object recognition, object classification, object segmentation, object capture and reconstruction, optical touch, augmented reality presentation, or other applications. Object detection can refer to detecting presence of an object in captured visual data, which can include an image or video. Object tracking can refer to tracking movement of the object. Object recognition can refer to identifying a particular object, such as identifying a type of the object, identifying a person, and so forth. Object classification can refer to classifying an object into one of multiple classes or categories. Object segmentation can refer to segmenting an object into multiple segments. Object capture and construction can refer to capturing visual data of an object and constructing a model of the object. Optical touch can refer to recognizing gestures made by a users hand, a stylus, or other physical artifact that are intended to provide input to a system. The gestures are analogous to gestures corresponding to movement of a mouse device or gestures made on a touch-sensitive display panel. However, optical touch allows the gestures to be made in three-dimensional (3D) space or on a physical target that is not configured to detect user input.

Augmented reality presentation can refer to a presentation of a physical, real-world environment that is augmented by additional information, including audio data, video data, image data, text data, and so forth. In augmented reality, the visual sensor (or a cluster of visual sensors) can capture visual date of a physical target. In response to recognition of the captured physical target an augmented reality presentation can be produced. For example, the physical target can be a picture in a newspaper or magazine, and the capture of the picture can cause an online electronic game to start playing. The given picture in the newspaper or magazine can be a game character, an advertisement, or other information associated with the online electronic game. The augmented reality presentation that is triggered can include the visual data of the captured physical target, as well as other data (e.g. game environment) surrounding the captured visual data.

Ambient light sensor 164*a* is arranged to measure the intensity of light of the environment surrounding system 100, in order to, in some implementations, adjust the camera's and/or sensor's (e.g., sensors 164*a*, 164*b*, 164*c*, 164*d*) exposure settings, and/or adjust the intensity of the light emitted from other sources throughout system such as for example, projector assembly 184, display 152, etc. Camera 164*b* may in some instances, comprise a color camera which is arranged to take either a still image or a video of an object and/or document disposed on mat 200. Depth sensor 164*c* generally indicates when a 3D object is on the work surface. In particular, depth sensor 164*c* may sense or detect the presence, shape, contours, motion, and/or the 3D depth of an object (or specific feature(s) of an object) placed on mat 200 during operation. Depth camera 164*c* may be relatively robust against effects due to lighting change, presence of a shadow, or dynamic background produced by a projector. The output information from the depth sensor 164*c* may be three-dimensional (3D) depth information (also referred to as a "depth map"), infrared (IR) image frames and red-green-blue (RGB) image frames. An "image frame" refers to a collection of visual data points that make up an image. Depth information refers to a depth of the physical target with respect to the depth camera; this depth information represents the distance between the physical target (or a portion of the physical target) and the depth camera. The depth and IR sensors may be used to aid segmentation of 2D objects that appear close in RGB color (e.g. white on white) to capture mat surface 200. The 2D object may not appear different than mat 200 in visual light frequencies but may have different reflectivity in the IR wavelengths and thus able to assist segmentation so long as pixels in one sensor image are known to correspond to pixels in the other sensor's image. If the depth sensor detects differences in the object height relative to the mat height, the analysis of its image can aid foreground/background segmentation using a transformation of the pixels from the depth image into the RGB image.

Thus, in some implementations, sensor 164*c* may employ any suitable sensor or camera arrangement to sense and detect a 3D object and/or the depth values of each pixel (whether infrared, color, or other) disposed in the sensor's field-of-view (FOV). For example, in some implementations sensor 164c may comprise a single infrared (IR) camera sensor with a uniform flood of IR light, a dual IR camera sensor with a uniform flood of IR light, structured light depth sensor technology, time-of-flight (TOF) depth sensor technology, or some combination thereof. In some implementations, depth sensor 164c may be used as a reference sensor for aligning all other sensors and projector, which will be discussed in more detail below.

User interface sensor (e.g., gesture sensor) 164d includes any suitable device or devices (e.g., sensor or camera) for tracking a user input device such as, for example, a hand, stylus, pointing device, etc. In some implementations, sensor 164d includes a pair of cameras which are arranged to stereoscopically track the location of a user input device (e.g., a stylus) as it is moved by a user about the mat 200, and particularly about surface 202 of mat 200. In other examples, sensor 164d may also or alternatively include an infrared camera(s) or sensor(s) that is arranged to detect infrared light that is either emitted or reflected by a user input device. Accordingly, the output information from sensor 164d may be 3D coordinates (i.e., x, y and z) of detected features (e.g., finger, stylus and tool).

It should further be appreciated that bundle 164 may comprise other sensors and/or cameras either in lieu of or in addition to sensors 164a, 164b, 164c, 164d, previously described. In addition, as will explained in more detail below, each of the sensors 164a, 164b, 164c, 164d within bundle 164 is electrically and communicatively coupled to device 150 such that data generated within bundle 164 may be transmitted to device 150 and commands issued by device 150 may be communicated to the sensors 164a, 164b, 164c, 164d during operations. As is explained above for other components of system 100, any suitable electrical and/or communicative coupling may be used to couple sensor bundle 164 to device 150 such as for example, an electric conductor, WI-FI, BLUETOOTH®, an optical connection, an ultrasonic connection, or some combination thereof. In this example, electrical conductors are routed from bundle 164, through top 160, upright member 140, and projector unit 180 and into device 150 through the leads that are disposed within mounting member 186, previously described.

In one implementation, bundle 164 is calibrated in order for all the sensors to work together. If bundle 164 is not properly calibrated, then combining the visual data collected by the sensors (e.g., sensors 164a, 164b, 164c, 164d) may not provide accurate results. Accordingly, to allow for proper operation of bundle, a calibration procedure may be performed to calibrate the visual sensors with respect to each other, which will be described in more detail below. In accordance with some implementation, calibration mechanisms or techniques are provided to calibrate sensors that are part of bundle 164. In addition, sensors 164a, 164b, 164c, 164d may all need to be aligned with projector unit 180. Such alignment provides communication between all these components. More specifically, the alignment provides propagating information across different sensors and projecting information from all sensors for further processing in the various applications of system 100. For the alignment to be achieved, a common coordinate system may need to be established. More specifically, when one sensor locates an object within the field of view, the other sensors and projector unit 180 may identify the location of such object in their own coordinate systems.

In one implementation, system 100 may include a program for verifying alignment of the components within system 100 with respect to each other. The program may be initiated by software executing within device 150. As an example, the program may verify whether touch sensitive mat 200 is properly aligned with respect to other components, and whether sensor bundle 164 is calibrated properly with respect to the projector assembly 184, as will be further described. As an example, the verification program may be executed regularly (e.g., once a week), at power up of system 100, or upon a reconnection of mat 200. If misalignment of components within system 100 is detected, calibration operations may be performed.

As an example, alignment of the components within system 100, at least between projector assembly 184 and touch sensitive surface 202, may be verified by detecting corners of touch sensitive surface 202 and corners of projector display space, and determining any correspondence between the two sets of corners, based according to mapping methods, such as homography. As an example, vector offsets may be generated between the two sets of corners in order to determine any correspondence. Based upon the differences detected between the two sets of corners, calibration operations (e.g., automatic and/or manual) may be performed on one or more components of system 100, as will be further described. As an example, the corners of touch sensitive surface 202 may be reversely mapped to corners of projector display space for estimating a realigning homography between projector assembly 184 and touch sensitive mat 200.

Figure 5:
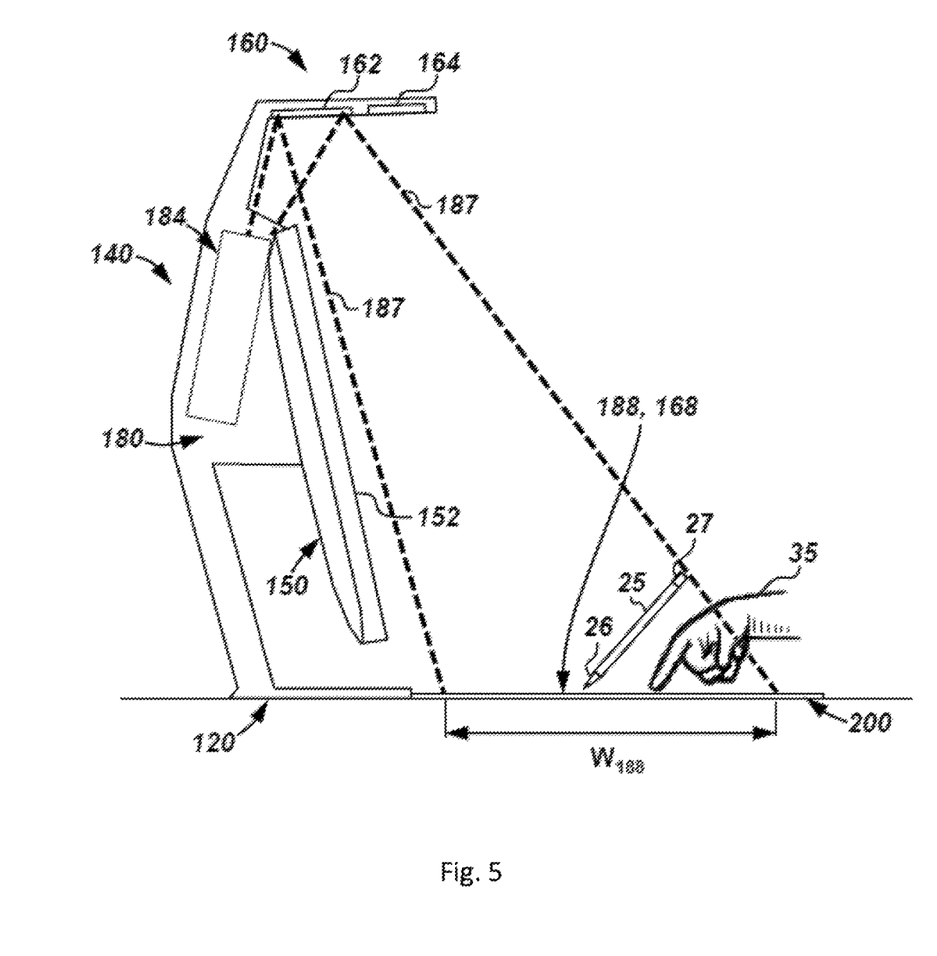
FIG. 5 is a schematic side view of the computer system of FIG. 1 during operation in accordance with the principles disclosed herein.
Figure 6:
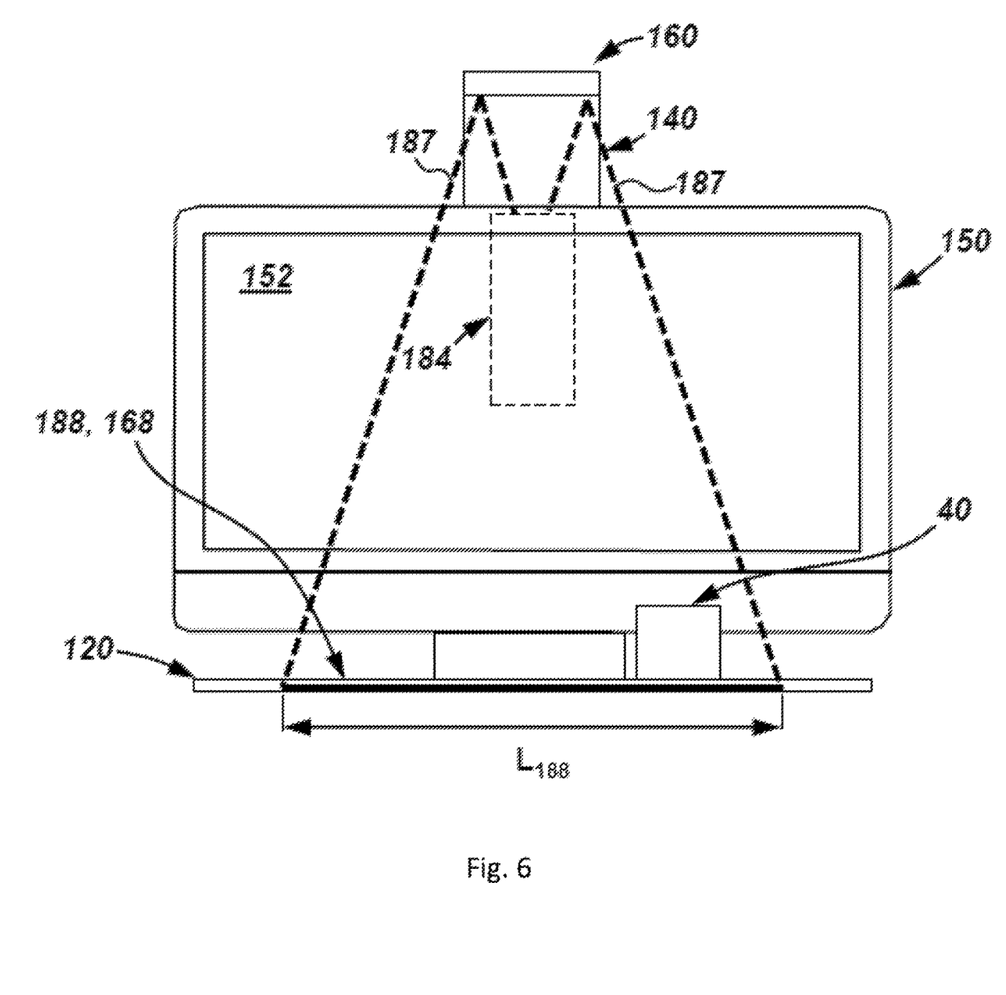
FIG. 6 is a schematic front view of the system of FIG. 1 during operation in accordance with the principles disclosed herein.

Referring now to FIGS. 5 and 6, during operation of system 100, light 187 is emitted from projector assembly 184, and reflected off of mirror 162 towards mat 200 thereby displaying an image on a projector display space 188. In this example, space 188 is substantially rectangular and is defined by a length L188 and a width W188. In some examples length L188 may equal approximately 16 inches, while width W188 may equal approximately 12 inches; however, it should be appreciated that other values for both length L188 and width W188 may be used while still complying with the principles disclosed herein. In addition, the sensors (e.g., sensors 164a, 164b, 164c, 164d) within bundle 164 include a sensed space 168 that, in at least some examples, overlaps and/or corresponds with projector display space 188, previously described. Space 168 defines the volume that the sensors within bundle 164 are arranged to monitor and/or detect the conditions thereof in the manner previously described. In some examples, both space 188 and space 168 coincide or correspond with surface 202 of mat 200, previously described, to effectively integrate the functionality of the touch sensitive surface 202, projector assembly 184, and sensor bundle 164 within a defined area. In one implementation, projector display space 188 may coincide with touch sensitive surface 202 of touch sensitive mat 200, such that a border of space 188 falls just within a border of surface 202.

Figure 7:
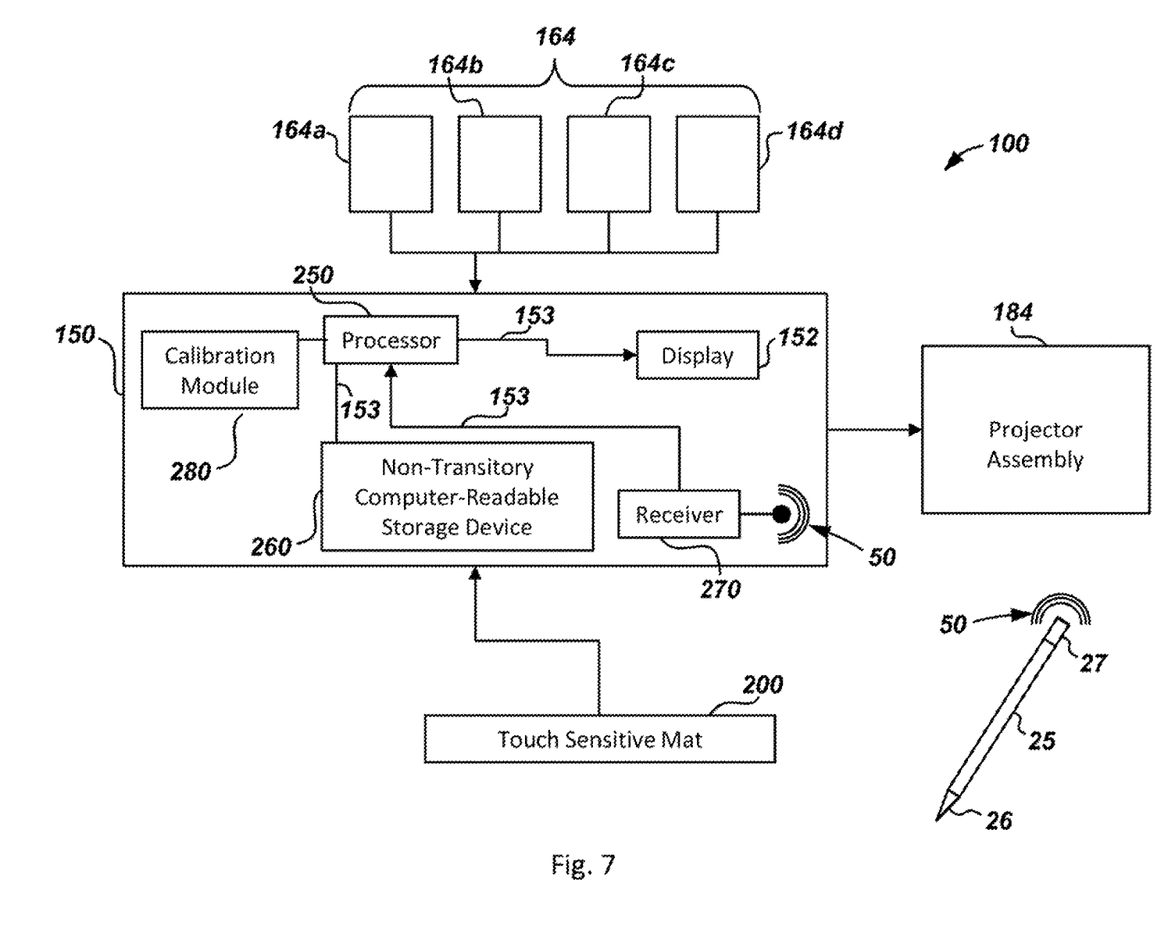
FIG. 7 is a black box circuit diagram of the computer system of FIG. 1 in accordance with the principles disclosed herein.

Referring now to FIGS. 5-7, in some examples, device 150 directs assembly 184 to project an image onto surface 202 of mat 200. In addition, device 150 may also display an image on the display 152 (which may or may not be the same as e image projected onto surface 202 by assembly 184). The image projected by assembly 184 may comprise information and/or images produced by software executing within device 150. A user (not shown) may then interact with the image displayed on surface 202 and display 152 by physically engaging the touch sensitive surface 202 of mat 200. Such interaction may take place through any suitable method such as direct interaction with a user's hand 35, through a stylus 25, or other suitable user input device(s). The multi sensor and projector calibration space allow users to introduce a physical object into this space, and the system is capable of tracking, capturing and effecting a visual effect on the object with the projector because of the sensor coordinate transformation capability.

As shown in FIG. 7, when a user interacts with surface 202 of mat 200, a signal is generated which is routed to device 150 through any of the electrical coupling methods and devices previously described. Once device 150 receives the signal generated within mat 200, it is routed, through internal conductor paths 153, to a processor 250 which communicates with a non-transitory computer-readable storage medium 260 to generate an output signal which then routed back to projector assembly 184 and/or display 152 to implement a change in the image projected onto surface 202 and/or the image displayed on display 152, respectively. It should also be appreciated that during this process, a user may also be interacting with the image displayed on display 152 through engagement with the touch sensitive surface disposed thereon and/or through another user input device such as, for example, a keyboard and mouse.

In addition, in some examples, stylus 25 further includes a transmitter 27 that is arranged to track the position of stylus 25 (whether or not stylus 25 is interacting with surface 202) and to communicate with a receiver 270 disposed within device 150 through a wireless signal 50. In these examples, input received by receiver 270 from transmitter 27 on stylus 25 is also routed through paths 153 to processor 250 such that an output signal may be generated and routed to the assembly 184 and/or the display 152 as previously described.

Further, in some examples, sensors included in sensor bundle 164 (e.g., sensors 164a, 164b, 164c, 164d) may also generate system input which is routed to device 150 for further processing by processor 250 and device 260. For example, in some implementations, sensor bundle 164 may sense the location and/or presence of a users hand 35 or stylus 25 and then generate an input signal which is routed to processor 250. Processor 250 then generates a corresponding output signal which is routed to display 152 and/or projector assembly 184 in the manner described above. In particular, in some implementations, bundle 164 includes a pair of cameras or sensors that are arranged to perform stereoscopic stylus tracking (e.g., of stylus 25). In still other implementations, stylus 25 includes a tip 26 that is coated in an infrared retro-reflective coating (e.g., paint), thus allowing it to serve as an infrared retro-reflector. Bundle 164 (and more particularly sensors 164c or 164d) may then further include infrared cameras or sensors as previously described which detect infrared light that is reflected off of tip 26 of stylus 25 and thus track the location of tip 26 as is moves across surface 202 during operation.

As a result, in some examples, the image projected onto surface 202 by assembly 184 serves as a second or alternative touch sensitive display within system 100. In addition, interaction with the image displayed on surface 202 is further enhanced through use of the sensors (e.g., sensors 164a, 164b, 164c, 164d) in sensor bundle 164 as described above.

Moreover, computing device 150 may comprise a calibration module 280 that is able to perform calibration procedures according to some implementations for calibrating sensors in bundle 164 and projector assembly 184. In some examples, calibration module 280 can be implemented as machine-readable instructions executable on one or multiple processors 250. In other examples, calibration module may exist in a calibration module system outside of computing device 150 and can be implemented as hardware. In one example, calibration module 280 may communicate with bundle 164 over a network. Further, non-transitory computer-readable storage medium 260 may store mapping information, where the mapping information relates to mappings between different sensors of bundle 164. The mapping information is used to perform calibration among the sensors of bundle 164 in addition to calibration with projector assembly 184. In one implementation, homography mappings between each pair of sensors in bundle 164 can be derived. A homography mapping is a 3D-to-2D mapping, and maps between three dimension (3D) coordinates (of the depth sensor 164c) and two dimensional (2D) coordinates (of another sensor in bundle 164). For example, a 3D homography mapping may be derived for the direct mapping between depth sensor 164c and gesture sensor 164d in sensor bundle 164. In another example, a projective mapping can be defined between the 3D coordinates of depth sensor 164c and the 2D coordinates of projector assembly 184. In particular, the 3D mapping between two sensors may include scale, rotation, translation and depth invariant.

In one example, the calibration is achieved by being able to map the data of one of the first (e.g., depth sensor 164c) and second (e.g., gesture sensor 164d) sensors to the coordinate space of the other of the first and second visual sensors. The system may use the first sensor's coordinate system or the second sensors coordinate system. This process may involve calculating a perspective transformation for the pair of sensors (the first and second sensors). The perspective transformation may be defined as the collineation set up in a plane by projecting on it the points of another plane from two different centers of projection, and each pair of sensors may have a calculated perspective transformation. In another example, a common coordinate system may be used based on physical real world coordinates based on a visible origin point that is visible in the field of view of at least one of the plurality of sensors. For example, a common coordinate system that shares a perspective transformation with the at least one of the plurality of sensors may be identified. This process may be re-iterated for each other pair of visual sensors in 164 to provide a direct 3D-to-2D mapping between each other pair sensors bundle 164.

Referring still to FIGS. 5-7, in addition, during operation of at least some examples, system 100 may capture a two dimensional (2D) image or create a 3D scan of a physical object such that an image of the object may then be projected onto the surface 202 for further use and manipulation thereof. In particular, in some examples, an object 40 may be placed on surface 202 such that sensors (e.g., camera 164b, depth sensor 164c, etc.) within 164 may detect, for instance, the location, dimensions, and in some instances, the color of object 40, to enhance a 2D image or create a 3D scan thereof. The information gathered by the sensors (e.g., sensors 164b, 164c) within 164 may then be routed to processor 250 which communicates with device 260 as previously described. Thereafter, processor 250 directs projector assembly 184 to project an image of the object 40 onto the surface 202. As explained in more detail above, when the projector and camera's calibration homography is used processor 250 may instruct an application in computer system 150 to draw a tight thin white outline around an object that may be detected by camera 164b viewing object 40. As a result of the calibration process (e.g., using a common coordinate system, resulting in the same resolution and image aspect ratio across all the sensors and projector), the projected outlines match up with physical locations of object 40.

It should also be appreciated that in some examples, other objects such as documents or photos may also be scanned by sensors within bundle 164 in order to generate an image thereof which is projected onto surface 202 with assembly 184. In addition, in some examples, once an object(s) is scanned by sensors within bundle 164, the background of the image may be optionally, digitally removed within the resulting image projected onto surface 202 (or shown on display 152 of device 150). Thus, in some examples, images of physical objects (e.g., object 40) may be captured, digitized, and displayed on surface 202 during operation to quickly and easily create a digital version of a physical object to allow for further manipulation thereof consistent with the manner described herein.

As noted above, a projective mapping can be defined between the 3D coordinates of depth sensor 164c and the 2D coordinates of projector assembly 184. Projector assembly 184 may be used to project a calibration pattern (which is a known or predefined pattern) onto the projection surface 202. In one implementation, the calibration pattern may be projected onto a white flat surface object to make the projected content visible. In some examples, the object can be a plane that is in 3D space. The calibration pattern may be a checkerboard pattern.

Depth sensor 164c may capture a calibration pattern image that is projected onto the object by projector assembly 184. The visual data (of the projected calibration pattern image) captured by depth sensor 164c is in a 3D space (defined by 3D coordinate), while the calibration pattern projected by projector assembly 184 is in 2D space (defined by 2D coordinates). The projective mapping between the 3D coordinates of depth sensor 164c and the 2D coordinates of the projector assembly 184 is defined by Eq. 1 below:

$$x = FX_2 \tag{Eq. 1}$$

where x represents 2D coordinates and X represents 3D coordinates. More specifically, Eq. 1 can be written as $$\begin{bmatrix} u \\ v \\ 1 \end{bmatrix} = z_c \cdot K[Rt] \begin{bmatrix} x_w \\ y_w \\ z_w \\ 1 \end{bmatrix}, \tag{Eq. 2}$$

where $x = [u\ v\ 1]^T$ represents 2D coordinates, $X = [x_w\ y_w\ z_w\ 1]^T$ represents 3D coordinates, $z_c$ is an arbitrary scale (having a predefined value), K represents intrinsic parameters, R represents extrinsic rotation parameters, and t represents extrinsic translation parameters. The intrinsic parameters K are defined as follows:

$$K = \begin{bmatrix} f_x & p & u_0 \\ 1 & f_y & v_0 \\ 1 & 1 & 1 \end{bmatrix}, \tag{Eq. 3}$$

where $f_x$, $f_y$ represent focal lengths of a lens of the visual sensor, $u_O$, $v_O$ represent an optical center along an optical axis of the visual sensor, and s is a skew coefficient that represents skew distortion of the visual sensor.

The extrinsic rotation parameters (R) and extrinsic translation parameters (t) are part of the geometric parameters of a sensor. The rotation parameters can define the pan, tilt, and yaw of a visual sensor in geometric space. The translation parameters can define a translational position of the visual sensor in geometric space.

In the manner described, through use of examples of a computer system 100 in accordance with the principles disclosed herein, an additional touch sensitive display may be projected onto a touch sensitive surface (e.g., surface 202) to provide dual screen capability for a computing device (e.g., device 150). In addition, through use of a computer system 100 in accordance with the principles disclosed herein, a physical object (e.g., object 40) may be scanned thereby creating a digital version of the physical object for viewing and/or manipulation on a display surface of a computing device (e.g., display 152 and/or surface 202). Further, through use of a computer system 100 in accordance with the principles disclosed herein, a digital shared workstation for remotely positioned users may be created wherein physical content may be scanned, digitized, and shared among all concurrent users of the digital collaboration workstation, and user interaction with the digital content and/or physical objection is visible by all participants.

While device 150 has been described as an all-in-one computer, it should be appreciated that in other examples, device 150 may further employ the use of more traditional user input devices such as, for example, a keyboard and a mouse. In addition, while sensors 164a, 164b, 164c, 164d within bundle 164 have been described as each representing a single sensor or camera, it should be appreciated that each of the sensors 164a, 164b, 164c, and 164d may each include multiple sensors or cameras while still complying with the principles described herein. Further, while top 160 has been described herein as a cantilevered top, it should be appreciated that in other examples, top 160 may be supported at more than one point and is thus may not be cantilevered while still complying with the principles disclosed herein.

Figure 8:
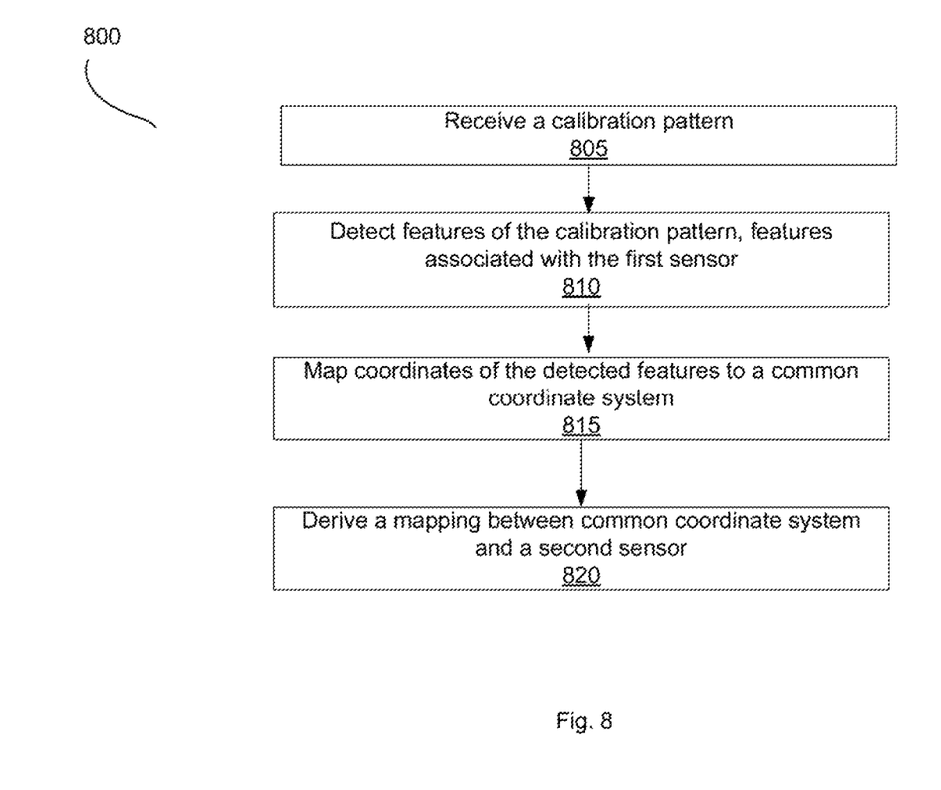
FIG. 8 is an example process flow diagram in accordance with the principles disclosed herein.

Turning now to the operation of the system 100, FIG. 8 illustrates an example process flow diagram 800 in accordance with an implementation. The process 800 depicts an example of method that may interact with a bundle of sensors and projection unit. The machine-readable instructions may instruct the processor 250 to allow system 100 to perform the process 800 as illustrated by the flowchart in FIG. 8. In one implementation, the system 100 may perform the process 800 in response to receiving an instruction from a user to control the projection system.

The process 800 may begin at block 805, where a first sensor in the plurality of sensors in the system captures a calibration pattern and provides to a calibration module. In one example, the calibration pattern may be a known or predefined pattern. For example, the calibration pattern may be checkerboard pattern.

At block 810, the calibration module of the system detects features from the sensor in the sensor bundle. In one implementation, the calibration module detects features of the calibration pattern. For example, the feature detection involves identifying features of the checkerboard pattern of an example calibration pattern image. In one example, the features may be associated with coordinates in the coordinate space of the first sensor.

At block 815, the calibration module maps the coordinates of the detected features to a common coordinate space. In one example, the common space coordinates may represent a coordinate space defined at an arbitrary distance from a first place associated with the first sensor. Moreover, the common coordinate space may share a perspective transformation with the first sensor.

At block 820, the calibration module derives a mapping between coordinates in the coordinate space of a second sensor and the common coordinate space based on the mapped coordinates (and more specifically the common coordinate space) and the coordinates in the coordinate space of the first sensor. More specifically, the mappings can be used for calibrating the sensors in the sensor bundle with each other.

In another implementation, the calibration module derives a mapping between coordinates in the coordinate space of a projector and the common coordinate space based on the mapped coordinates. This mapping may be used to calibrate the projector with the sensors in the sensor bundle.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
    a projector;
    a computer comprising instructions and attachable to the projector,
    a plurality of sensors communicatively coupled to the computer; and
    the computer to store mapping information relating to mappings between the plurality of sensors and the projector in a common coordinate system, and
    wherein the instructions are executable by the computer to:
        calibrate the plurality of sensors and the projector using the mapping information, and
        align the projector and a touch sensitive surface, the projector to project an image onto the touch sensitive surface, and the touch sensitive surface within a field of view of the plurality of sensors to capture an interaction between an object and the touch sensitive surface, the aligning of the projector and the touch sensitive surface comprising aligning a point of a projector display space of the projector and a corresponding point of the touch sensitive surface.

2. The system of claim 1, wherein the instructions are executable by the computer to calculate perspective transformation between the plurality of sensors to derive the mappings between the plurality of sensors.

3. The system of claim 1, wherein the instructions are executable by the computer to map the plurality of sensors and the projector to a reference sensor, wherein the reference sensor is a depth sensor.

4. The system of claim 1, wherein the mappings comprise a three dimension (3D)-to-two dimensional (2D) mapping that maps between 3D coordinates of a first sensor and 2D coordinates of a second sensor in the plurality of sensors.

5. The system of claim 1, wherein the plurality of sensors comprises a depth sensor and a gesture sensor, and the mappings comprise a mapping of data of the depth sensor and the gesture sensor.

6. The system of claim 1, wherein the plurality of sensors comprises a depth sensor, and the mappings comprise a projection mapping between 3D coordinates of the depth sensor and 2D coordinates of the projector.

7. The system of claim 1, wherein the mappings between the plurality of sensors include data related to scale, rotation, translation, and depth.

8. The system of claim 1, wherein one of the plurality of sensors is a depth sensor, and the depth sensor detects a calibration pattern projected by the projector onto the touch-sensitive surface.

9. The system of claim 8, wherein the calibration pattern comprises a checkerboard pattern.

10. The system of claim 8, wherein the calibration pattern is used in relation to the mappings between the plurality of sensors and the projector in the common coordinate system.

11. The system of claim 1, wherein the plurality of sensors comprise a plurality of cameras, some of which are used for depth detection, gesture sensing, and stereoscopic stylus tracking.

12. A method performed by a system comprising a hardware processor for providing a calibration between a plurality of sensors and a projector, comprising:
    receiving a calibration pattern, wherein the plurality of sensors comprises a first sensor and a second sensor;
    detecting features of the calibration pattern, the features associated with coordinates in a coordinate space of the first sensor;
    mapping the coordinates of the detected features to a common coordinate space;
    deriving a mapping between coordinates in the coordinate space of a second sensor and the common coordinate space based on the mapped coordinates and the coordinates in the coordinate space of the first sensor; and
    aligning a point of a projector display space of the protector and a corresponding point of a touch sensitive surface, the projector to project an image onto the touch sensitive surface, and the touch sensitive surface within a field of view of the plurality of sensors to capture an interaction between an object and the touch sensitive surface.

13. The method of claim 12, further comprising calculating a perspective geometry between the first sensor and the second sensor.

14. The method of claim 12, further comprising deriving a projective mapping between the plurality of sensors and the projector.

15. The method of claim 14, wherein the plurality of sensors comprises a depth sensor, and the projective mapping is between 3D coordinates of the depth sensor and 2D coordinates of the projector.

16. The system of claim 1, wherein the aligning of the point of the projector display space of the projector and the corresponding point of the touch sensitive surface comprises aligning a corner of the projector display space of the projector and a corresponding corner of the touch sensitive surface.

17. The system of claim 1, wherein the instructions are executable by the computer to:
    determine an offset between the point of the projector display space of the projector and the corresponding point of the touch sensitive surface, and
    map, based on the offset, the corresponding point of the touch sensitive surface to the point of the projector display space of the projector to perform the aligning of the projector and the touch sensitive surface.

18. The system of claim 1, wherein the plurality of sensors are to capture a touch input made by a user's hand or a stylus with the image projected by the projector onto the touch sensitive surface.

19. The method of claim 12, further comprising:
    determining an offset between the point of the projector display space of the projector and the corresponding point of the touch sensitive surface, and mapping, based on the offset, the corresponding point of the touch sensitive surface to the point of the projector display space of the projector to perform aligning of the projector and the touch sensitive surface.

20. A non-transitory machine-readable storage medium storing instructions that upon execution cause a system to:
receive a calibration pattern;
detect features of the calibration pattern, the features associated with coordinates in a coordinate space of a first sensor of a plurality of sensors;
map coordinates of the detected features to a common coordinate space;
derive a mapping between coordinates in the coordinate space of a second sensor of the plurality of sensors and the common coordinate space based on the mapped coordinates and the coordinates in the coordinate space of the first sensor; and
align a point of a projector display space of the projector and a corresponding point of a touch sensitive surface, the projector to project an image onto the touch sensitive surface, and the touch sensitive surface within a field of view of the plurality of sensors to capture a touch interaction between an object and the touch sensitive surface.

\* \* \* \* \*

UNITED STATES PATENT AND TRADEMARK OFFICE
CERTIFICATE OF CORRECTION

PATENT NO. : 10,241,616 B2
APPLICATION NO. : 15/121690
DATED : March 26, 2019
INVENTOR(S) : Nicholas P Lyons et al.

It is certified that error appears in the above-identified patent and that said Letters Patent is hereby corrected as shown below:

On the Title Page

On page 2, item (56), U.S. Patent Documents, in Column 1, Line 20, delete "Mandalla et al." and insert -- Mandella et al. --, therefor.

In the Claims

In Column 14, Line 29, in Claim 12, delete "protector" and insert -- projector --, therefor.

Signed and Sealed this
Twenty-fifth Day of June, 2019

Andrei Iancu
*Director of the United States Patent and Trademark Office*